(12) United States Patent
Mahajan et al.

(10) Patent No.: US 12,269,744 B2
(45) Date of Patent: Apr. 8, 2025

(54) ONE-POT PROCESS FOR SYNTHESIS OF GRAPHENE AND GRAPHENE-DERIVATIVES FROM COAL

(71) Applicant: VIRGINIA TECH INTELLECTUAL PROPERTIES, INC., Blacksburg, VA (US)

(72) Inventors: Roop L. Mahajan, Fairfax, VA (US); Seul-Yi Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 839 days.

(21) Appl. No.: 17/415,445

(22) PCT Filed: Dec. 17, 2019

(86) PCT No.: PCT/US2019/066941
§ 371 (c)(1),
(2) Date: Jun. 17, 2021

(87) PCT Pub. No.: WO2020/131928
PCT Pub. Date: Jun. 25, 2020

(65) Prior Publication Data
US 2022/0024771 A1 Jan. 27, 2022

Related U.S. Application Data

(60) Provisional application No. 62/780,502, filed on Dec. 17, 2018.

(51) Int. Cl.
*C01B 32/198* (2017.01)
*B01J 19/14* (2006.01)
(Continued)

(52) U.S. Cl.
CPC ............. *C01B 32/198* (2017.08); *B01J 19/14* (2013.01); *C01B 32/194* (2017.08);
(Continued)

(58) Field of Classification Search
CPC ................................................... C01B 32/198
See application file for complete search history.

(56) References Cited

U.S. PATENT DOCUMENTS

| 4,083,940 A | 4/1978 | Das |
| 6,475,461 B1 | 11/2002 | Ohsaki et al. |

(Continued)

FOREIGN PATENT DOCUMENTS

EP 2960274 A1 12/2015

OTHER PUBLICATIONS

Novoselov, et al., "A roadmap for graphene", (2012) Nature 490(7419):192-200.

(Continued)

*Primary Examiner* — Stuart L Hendrickson
(74) *Attorney, Agent, or Firm* — John S. Sears; Johnson, Marcou, Isaacs & Nix, LLC

(57) ABSTRACT

Methods of making graphene oxide and reduced graphene oxide are provided. The methods can include a simple one-pot synthesis of graphene oxide from a purified coal powder using a mild oxidizing acid. The methods provide for an improved, more cost-effective, and simpler process than conventional methods such as Hummers methods. In some aspects, placing the purified coal powder in the mild oxidation atmosphere includes contacting the purified coal powder with a mild oxidizing acid such as nitric acid, nitrous acid, sulfuric acid, phosphoric acid, benzoic acid, or a combination thereof. In some aspects, the mild oxidizing acid consists essentially of nitric acid. Graphene oxides and reduced graphene oxides prepared by the methods are also provided.

18 Claims, 10 Drawing Sheets

(51) Int. Cl.
*C01B 32/194* (2017.01)
*C01B 32/196* (2017.01)

(52) U.S. Cl.
CPC ........ *C01B 32/196* (2017.08); *C01P 2002/85* (2013.01); *C01P 2004/03* (2013.01); *C01P 2004/04* (2013.01); *C01P 2004/61* (2013.01); *C01P 2004/62* (2013.01); *C01P 2004/64* (2013.01)

(56) References Cited

U.S. PATENT DOCUMENTS

2017/0198221 A1 7/2017 Targett et al.
2018/0282163 A1 10/2018 Tour et al.
2019/0194022 A1 6/2019 Atkins et al.

OTHER PUBLICATIONS

Pei et al., " Green synthesis of graphene oxide by seconds timescale water electrolytic oxidation", (2018) Nature Communications 9(1):145, 9 pages.
Kim et al., "Two Dimensional Soft Material: New Faces of Graphene Oxide", (2012) Accounts of Chemical Research 45(8):1356-1364.
Spencer et al., "A flake's chance in cell: quantifying graphite demand", Canaccord Genuity, Specialty Minerals and Metals, (2017) 68 pages.
Ye RQ, et al., "Coal as an abundant source of graphene quantum dots", (2013) Nat Commun 4, 7 pages.
Ye RQ, et al., "Bandgap Engineering of Coal-Derived Graphene Quantum Dots," (2015) Acs Appl Mater Inter 7(12):7041-7048.

ONE-POT PROCESS FOR SYNTHESIS OF GRAPHENE AND GRAPHENE-DERIVATIVES FROM COAL

CROSS-REFERENCE TO RELATED APPLICATIONS

This application is the 35 U.S.C. § 371 national stage application of PCT Application No. PCT/US2019/066941, filed Dec. 17, 2019, where the PCT claims priority to, and the benefit of, U.S. provisional application entitled "ONE-POT PROCESS FOR SYNTHESIS OF GRAPHENE AND GRAPHENE-DERIVATIVES FROM COAL" having Ser. No. 62/780,502, filed Dec. 17, 2018, both of which are herein incorporated by reference in their entireties.

TECHNICAL FIELD

The present disclosure generally relates to carbon materials and methods of making thereof.

BACKGROUND

Graphene has a highly ordered structure of a single layer of carbon atoms arranged in a hexagonal lattice, see FIG. 1A. It is the basic structural element of many other allotropes of carbon, such as graphite, diamond, charcoal, carbon nanotubes and fullerenes. In its pristine form, it has strong chemical resistance, large specific surface area (2,630 m$^2$/g), high Young's modulus (1 TPa), high thermal conductivity (5,000 W/mK), and high electron mobility (2.5e5 cm$^2$ V/s) (1). Due to these superior properties, it has been explored for use in a variety of applications including thermal interface materials, light weight and impact-resistant composites, corrosion-resistant coatings, filters for water purification, more efficient electrodes for energy storage or conversion, to name a few.

Normally two approaches are used for the graphene production—the bottom-up and top-down. In the former, mixed hydrocarbon gases and metal substrates are used to produce graphene through chemical vapor or epitaxial deposition. However, this approach, although desirable for producing high quality graphene, is not amenable to large-scale production due to high cost and long processing times.

The top-down approach uses oxidation and mechanical exfoliation to produce graphene oxide (GO), which is further reduced chemically or thermally to produce reduced graphene oxide (rGO), i.e. graphene. The most common top-down technique, currently in favor, is the Hummers' method that uses intensive oxidation and mechanical exfoliation to produce GO, see FIG. 1B for its molecular model. The underlying mechanism is the intercalation of oxygen functional groups into graphite layers followed by the isolation of individual GO sheets. This reaction requires a large amount of concentrated $H_2SO_4$ and $KMnO_4$ with an auxiliary agent, such as $H_3PO_4$, $KClO_3$, or $NaNO_3$ to ensure sufficient oxidation of graphite. This process is capable of yielding a great number of oxygen-containing functional groups, such as hydroxyl, epoxy, and carboxyl, which are covalently bonded to graphene basal or edge planes within a C/O atomic ratio of approximately up to 2.0 (2, 3). Typical schematic diagram of Hummers' method is presented in FIG. 2.

Although feasible for mass production, Hummers' method still suffers from several limitations; it contains multiple steps, uses excessive and expensive strong acids and oxidants posing health hazards. In particle, it produces hazardous gases including $NO_x$ and carcinogenic $ClO^-$ during the oxidation as well as large quantities of wastewater containing residual acids and heavy metals resulting in chemical disposal problems.

In addition, the price of the precursor material (graphite) has steadily risen in recent years on increasing demand from the growing electric car battery markets and Li-ion battery manufacturers. According to the Canaccord Genuity report in 2017, total demand for graphite from Li-ion battery is estimated to increase from 150 kiloton in 2015, to more than 1 M ton in 2025, representing a CAGR of 23% (4).

To exploit the full potential of graphene as a disruptive and transforming material for a range of applications touching many aspects of our lives, there is a need for alternative precursor materials and processes for cheaper and eco-friendly mass production of graphene. Not surprisingly, this is an active area of research in academia and industry.

Coal is a macromolecular solid that has an incompact and complex structure. It includes graphitic crystalline domains linked by amorphous carbon chains in three dimensions, while graphite is composed of flat sheets of graphene layers attached to each other. In addition, coal contains Å or nm-scaled graphitic crystalline domains along with variable quantities of other elements, e.g. H, S, O, and N. It has been reported recently that graphene quantum dots can be extracted and separated from the crystalline domains in Bituminous coal, using $H_2SO_4$ and $HNO_3$ and followed NaOH or NaS treatments (5, 6).

Depending on the degree of metamorphism, coal is available as Anthracite, Bituminous, and Lignite, each of them exhibiting different properties. As a result, the coal-derived graphene can be produced in different sizes, morphologies, and chemical species on the graphene edge or basal plane, which strongly influence the thermal, electrical, optical, and mechanical properties.

There remains a need for improved methods of producing graphene and graphene derivatives that overcome the aforementioned deficiencies.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figure 1A:
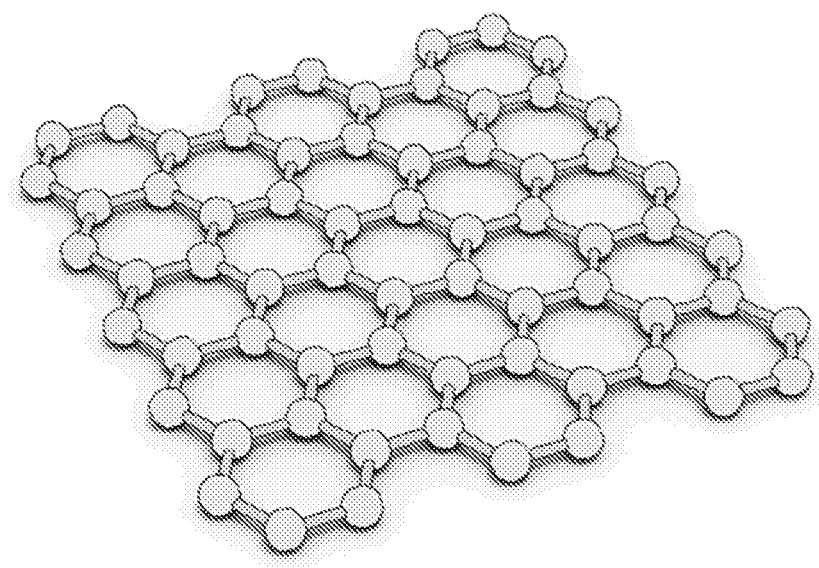
FIGS. 1A-1B show typical molecular models of graphene (FIG. 1A) and graphene oxide (FIG. 1B).
Figure 1B:
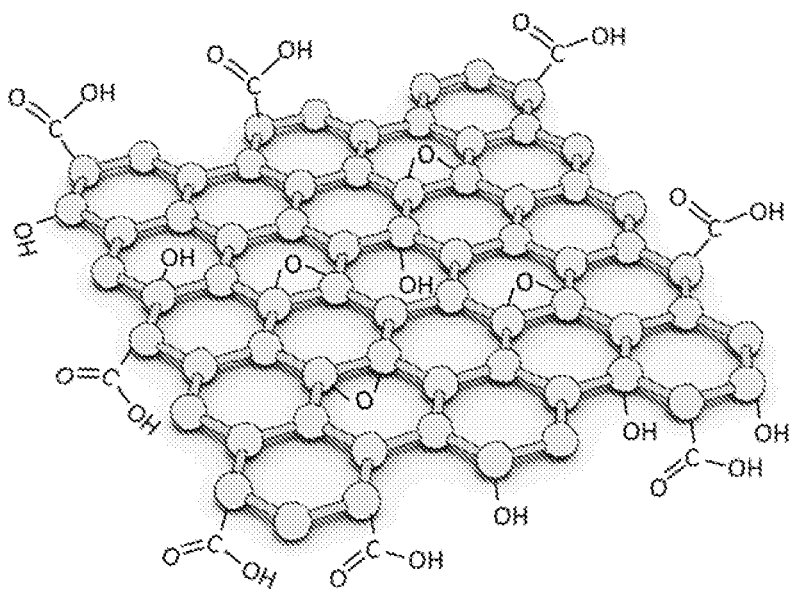
Figure 2:
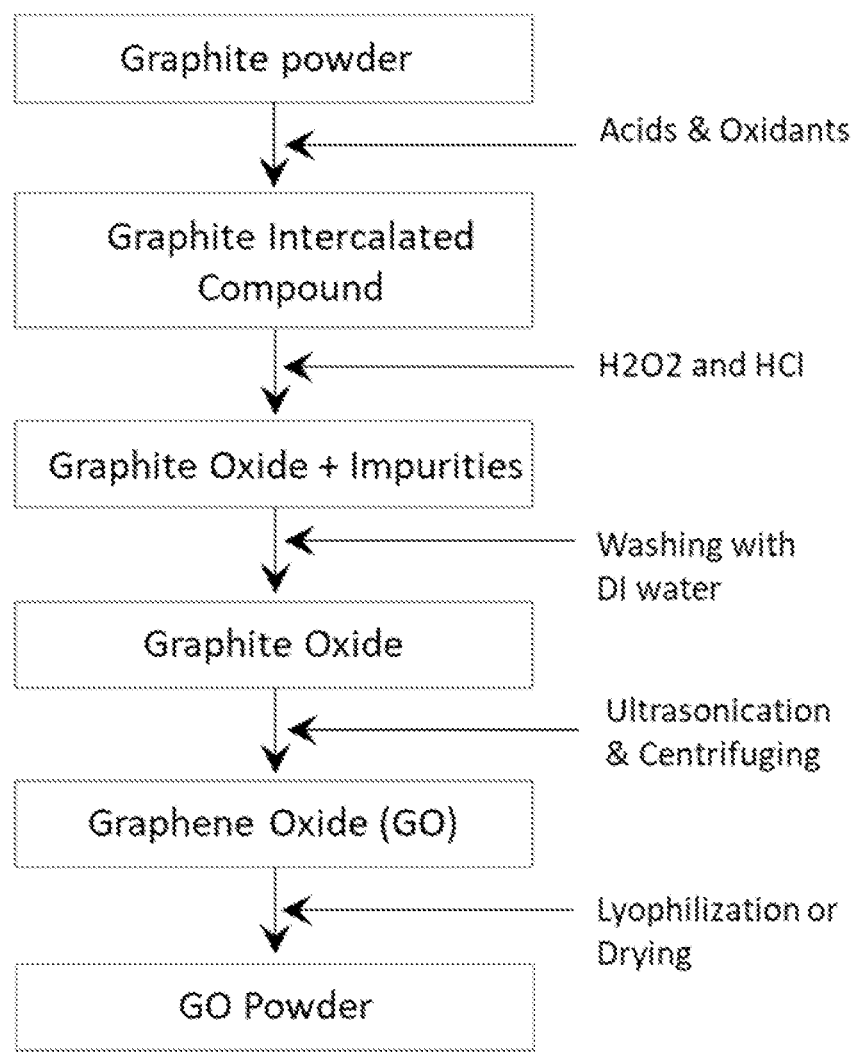
FIG. 2 shows a schematic diagram of Hummers' method for graphite-derived graphene oxide.
Figure 3:
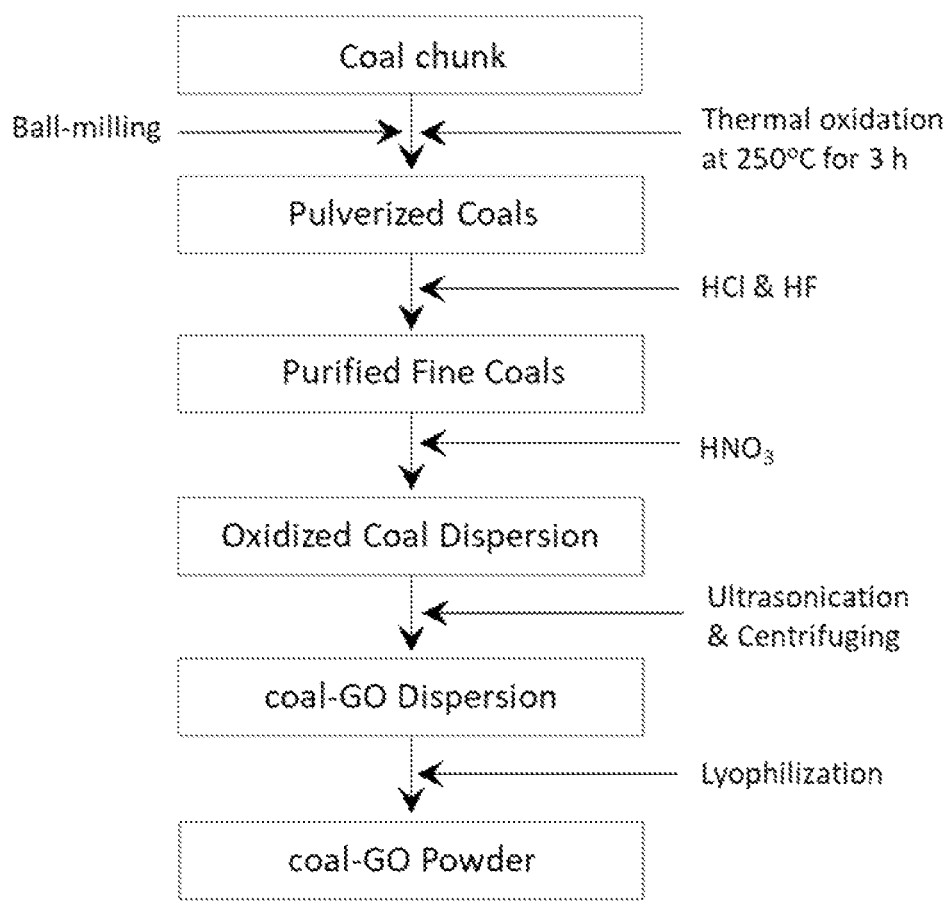
FIG. 3 shows a brief description of the one-pot chemical route for coal-derived graphene oxide.

In various aspects, methods are provided that overcome one or more of the aforementioned deficiencies. A process is described for synthesis of graphene and its derivatives, which can be exploited for a variety of applications. The three major steps involved in the conversion of coal to graphene include, in some aspects, (i) pretreatment (pulverization and purification) of as-received coal, (ii) an oxidation process to convert coal to graphene oxide (GO), and (iii) a reduction process to convert GO to graphene (rGO). In some aspects, the pretreatment can be carried out by ball-milling followed by sieving. The finest coal powder can be immersed in 10% HF and 5% HCl, in sequence, to remove inherent metal and silica impurities in the coal. In some aspects, the purified coal powder is then oxidized in $HNO_3$ solution in the range of room temperature to 120° C. under a reflux condition. The finest coal powder can be immersed in 10% HF and 5% HCl, in sequence, to remove inherent metal and silica impurities in the coal. The purified coal powder can be then oxidized in $HNO_3$ solution at 80° C. for ~5 hours to produce GO, hereafter called coal-GO. The unreacted coal impurities, if any, can be separated through centrifuging, which can be followed by freeze-drying (also known as lyophilization) to produce powdery coal-GO. In some aspects, a third and final step can be performed to produce coal-derived reduced graphene (coal-rGO) through thermal reduction at a wide range of temperature from 200 to 2000° C.

Finally, a cost comparison of producing graphene from coal using methods described herein with that of synthesizing graphene from graphite using the conventional Hummers' method shows an order of magnitude lower cost due to much smaller use of chemicals in the new simplified process. This advantage is expected to increase with scaling up of the process.

Other systems, methods, features, and advantages of methods of making graphene oxide will be or become apparent to one with skill in the art upon examination of the following drawings and detailed description. It is intended that all such additional systems, methods, features, and advantages be included within this description, be within the scope of the present disclosure, and be protected by the accompanying claims.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "graphene", as used herein, refers to two dimensional sheet of hexagonal carbon that includes single-layer graphene and few-layer graphene. The term "few-layer" graphene includes graphene having about 2-10 layers, preferably about 2-5 layers. The term "exfoliated graphite" includes from tens of layers to hundreds of layers of hexagonal carbon. For example, exfoliated graphite can include about 11 layers of more of graphene that has been intercalated and subsequently removed from bulk graphite. The term "exfoliate," as used herein, refers to an expansion of a bulk graphite lattice. The term "graphite" includes intercalated graphite, exfoliated graphite, and in some aspects, graphene.

The term "particle size" and "particle diameter", as used interchangeably herein, mean the average diameter of the image of the particle as viewed by electron microscopy, unless otherwise stated. The size distribution of a collection of particles can be characterized by several values. The term "average particle size" and "average particle diameter" mean the number average of the particle sizes of a collection of particles.

The term "mild oxidizing acid," as used herein, refers to a Brønsted-Lowry acids where the corresponding conjugate base has a standard reduction potential at 25° C. of about 1 V or less or, alternatively, refers to Brønsted-Lowry acids where the corresponding conjugate base has a reduction potential equal to or less than that of the conjugate base of nitric acid when measured under the same conditions. In some aspects, the mild oxidizing acid refers to the use of nitric acid or other acids having a similar oxidation ability for exfoliation of coal to graphene oxide. By comparison, Hummers and its modified protocols use sulfuric acid and potassium permanganate, coupled with phosphoric acid, sodium nitrate etc. depending on their protocols for the pre-oxidation and exfoliation of graphene.

The term "mild oxidation atmosphere," as used herein, refers to an environment that is free or essentially free of a strong oxidant. The term "strong oxidant," as used herein, refers to an oxidant having a standard reduction potential of about 1.5 V or greater, or alternatively refers to an oxidant having a reduction potential greater than or equal to the reduction potential of potassium permanganate in sulfuric acid when measured under the same conditions.

The term "substantially free," as used herein to refer to an impurity in a composition, means the amount of the impurity in the composition is not sufficient to alter the desired properties of the graphene oxide or reduced graphene oxide produced by the methods described herein. A composition that is substantially free can, in some aspects, contain less than 10%, less than 5%, or less than 2.5% of the impurity by weight. The term "essentially free," as used herein to refer to an impurity in a composition, means the peak associated with the impurity in an X-ray photoelectron spectra (XPS) of the composition is not readily discernable. The term "free," as used herein to refer to an impurity in a composition, means the impurity is present in an amount of about 1%, about 0.1%, or less by weight or means the impurity is completely absent from the composition.

Methods of Making Graphene Oxide and Reduced Graphene Oxide

In various aspects, methods of making or producing graphene oxide are provided. For example, the methods can include contacting a purified coal powder with a mild oxidation atmosphere at an elevated temperature with respect to room temperature for a period of time to produce a mixture containing the graphene oxide. The graphene oxide can be converted to a powder by lyophilizing the graphene oxide to produce a powder comprising the graphene oxide.

The methods can use coal as a source for preparing graphene oxide, providing an abundant and inexpensive source material. The term "coal," as used herein, refers to anthracite, bituminous, subbituminous, and lignite coals, and coke produced therefrom coal tar, asphalt, peat, bitumen, and the like." In some aspects, the coal is an anthracite coal.

The methods can produce graphene oxide and reduced graphene oxide from a purified coal powder. The purified coal powder can be provided as a starting material or, in some aspects, the methods further include producing a purified coal powder from a raw coal source. The raw coal source can be any coal source described above.

The purified coal powder will typically be a fine powder of the purified coal to provide a high surface area for contacting the mild oxidizing acids. In some aspects, the purified coal powder has an average particle size of about 100 µm, about 75 µm, about 50 µm, or less, e.g. about 20 µm to about 100 µm or about 25 µm to about 75 µm.

The purified coal powder will generally be free of impurities that would interfere with the methods or producing graphene oxide and/or would produce graphene oxide with unacceptable levels of impurity if used. In some aspects, the purified coal powder is substantially free, essentially free, or free of metal impurities selected from the group consisting of Al, Sb, As, Ba, Be, Cd, Ca, Cr, Co, Cu, Fe, Pb, Mg, Mn, Hg, Mo, Ni, K, Se, Ag, Na, Sr, Sn, V, and Zn. In some aspects, the purified coal powder is substantially free, essentially free, or free of Fe and Mg. In some aspects, the purified coal powder is substantially free, essentially free, or free of silicon (Si). In some aspects, the purified coal powder being free of an impurity is determined by a peak associated with the impurity not being discernable in an X-Ray photoelectron spectra of the purified coal powder.

In some aspects, the methods further include producing the purified coal powder from a raw coal source. For example, the methods can include (a) producing a raw coal powder by one or both of ball milling and sieving the raw coal; (b) heating the raw coal powder to remove organic impurities from the raw coal powder; and (c) removing metal and silica impurities from the raw coal powder by treating the raw coal powder with one or both of hydrofluoric acid and hydrochloric acid to produce the purified coal powder.

The methods include contacting a purified coal powder with a mild oxidation atmosphere. The mild oxidizing condition contains nitric acid, nitrous acid, sulfuric acid, phosphoric acid, benzoic acid, or a combination thereof. In some aspects, the mild oxidizing acid is essentially nitric acid.

The methods include contacting the purified coal powder with the mild oxidizing acid at an elevated temperature. As used herein, the term "elevated temperature" will be understood from the context and will generally include an elevated temperature with respect to room temperature. In some aspects, the elevated temperature is about 65° C. to 200° C., about 80° C. to 150° C., or about 90° C. to 130° C.

The methods include contacting the purified coal powder with the mild oxidation condition at the elevated temperature for a period of time. In general, the period of time will be sufficient to carry out the transformation of the purified coal powder to the graphene oxide. The exact time may of course depend on the specific elevated temperature chosen, e.g. a shorter time may suffice for a higher elevated temperature and vice versa. In some aspects, the period of time is at least about 1 min, at least about 2 hours, or at least about 3 hours. In some aspects, the period of time is about 1 min to 24 hours, about 1 hours to 5 hours, about 2 hours to about 5 hours, or about 2 hours to about 8 hours.

In some aspects, the elevated temperature and the period of time are related. For example, in some aspects, the method is performed in a continuous reactor, and the elevated temperature and the period of time are such that an integral $A=\int TE(t)dt$ is about 350 Kelvin hours or greater, where T is a steady state temperature of the reactor and $E(t)$ is a residence-time of the mixture in the continuous reactor. In some aspects, the method is performed in a batch reactor, and the elevated temperature and the period of time are such that an integral $A=\int_{t_0}^{t_f} T(t)dt$ is about 350 Kelvin hours or greater, where $T(t)$ is a temperature of the reactor at time t, $t_0$ is an initial time, and $t_f$ is a final time that the mixture is in the batch reactor. In both cases, the integral (A) can be about 350 Kelvin hours, about 400 Kelvin hours, about 500 Kelvin Hours, or more. In some aspects, A is about 400 Kelvin hours to about 2,250 Kelvin hours.

The methods can be performed in a variety of chemical reactors that are known to those skilled in the art. In some aspects, the methods are performed in a continuous reactor. The term "continuous reactor," as used herein, refers to a reaction vessel where raw materials or a feed stream containing the unreacted materials is added in an essentially continuous manner to the reaction vessel during operation. As used herein, the term "continuous reactor" includes the so-called "continuous stirred-tank reactor" (CSTR) as well as the so-called "plug-flow" (or tubular) reactor, but not the so-called "batch" reactor. (See, e.g., Chemical Reaction Engineering, by Octave Levenspiel, published 1967 by John Wiley and Sons, Inc.) The methods can also be performed in a batch process, e.g. using a batch reactor. The term "batch reactor," as used herein, refers to a reaction vessel where raw materials are added at one or a few time points (as opposed to an essentially continuous manner) and the reaction or transformation is performed. A batch reactor can include, for instance, a beaker or test tube, but can also include large industrial-scale batch reactors. It will be understood that, in some aspects, a reaction vessel may be operated in both a batch mode and a continuous mode. In such instances, the reaction vessel will be referred to as a 'continuous reactor" when it is operated in a continuous fashion and will otherwise be referred to as a 'batch reactor'.

In some aspects, even after the purified coal powder has been reacted to produce the graphene oxide, there may still exist some impurities in the reaction mixture. For example, the impurities can include unreacted coal impurities, unexfoliated coal impurities, or a combination thereof. In such aspects, the methods can further include separating the graphene oxide from the one or more impurities. The separating the graphene oxide from the one or more impurities can include any one or more of centrifugation, filtration, and sedimentation.

The graphene oxide can be further converted to a reduce graphene oxide. The developed coal-derived GO can be easily converted to reduced GO (rGO) by conventional reduction methods, chemically or thermally. The term "reduced graphene oxide" or "rGO" refers to a graphene oxide-based material in which oxyfunctional groups have been largely or almost entirely removed from the graphenic molecular structure. Thus, rGO has qualities and physical properties approaching those of pristine graphene, but is not completely identical due to the presence of residual oxyfunctional groups. In some aspects, the reduced graphene oxide is produced from the graphene oxide by heating the graphene oxide to a second elevated temperature for a second period of time while in an inert atmosphere to produce a reduced graphene oxide. In some aspects, the second elevated temperature is about 200° C. to 2000° C., about 200° C. to 1500° C., or about 400° C. to 1000° C. In some aspects, the second period of time is about 30 minutes to about 300 minutes or about 1 hour.

Graphene oxide and reduced graphene oxide produced by the methods described herein are also provided. The coal-derived GO shows uniform and very thin sheet-like morphologies. The coal-derived GO contains GO nanoscrolls due to its very thin structures. The developed thermally reduced coal-derived GO has smaller nanosheets than standard graphite-derived GO.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Experimental Procedures

For the morphologies of raw coal and purified coal, scanning electron microscopy (SEM) images were observed with a LEO 1550 field-emission scanning electron microscope (Zeiss Co., USA). The structural properties were analyzed using transmission electron microscopy (TEM) images with a filed-emission scanning electron microscope (JEOL 2100, Japan), operating at an acceleration voltage of 200 kV. The surface chemical composition of the purified coal, coal-derived GO, and its derivatives was analyzed with a VersaProbe III Scanning XPS Microprobe (Physical Electronics, U.S.A.), using a monochromatic AlKα X-ray source (1486.6 eV) at 100 W. Atomic force microscope (AFM) measurements are performed to obtain the surface morphologies and profile. A Pt/Ir-coated AFM microcantilever was used for reading and writing the domain state of coal-GO and coal-rGO with a Dimension Icon (Bruker, Germany). The mean size and particle size distribution were determined from a Zetasizer Nano ZS (Malvern Panalytical, U.K.).

Example 1: Production of Purified Coal

Figure 4A:
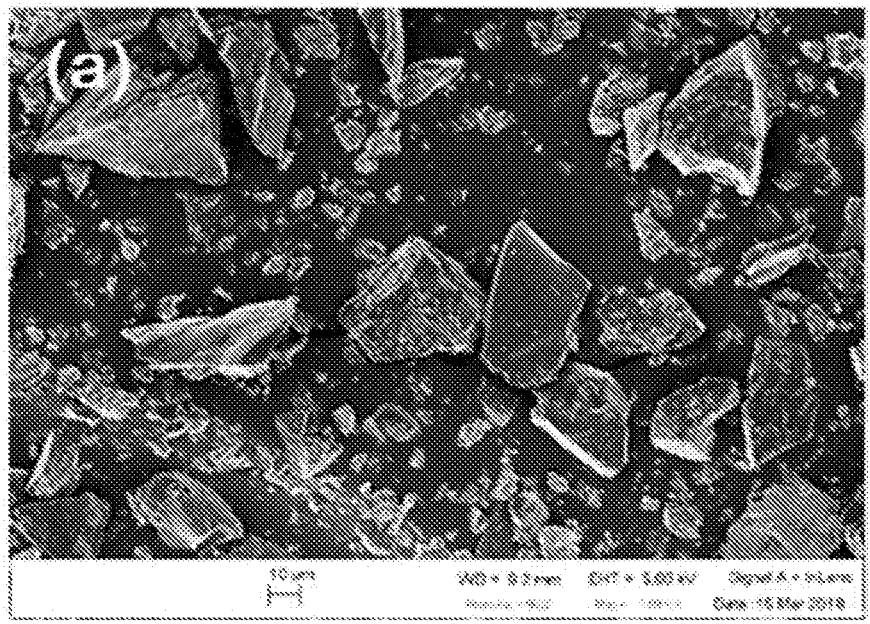
FIGS. 4A-4B show scanning electron microscope (SEM) images of raw coal (FIG. 4A) and purified coal (FIG. 4B).
Figure 4B:
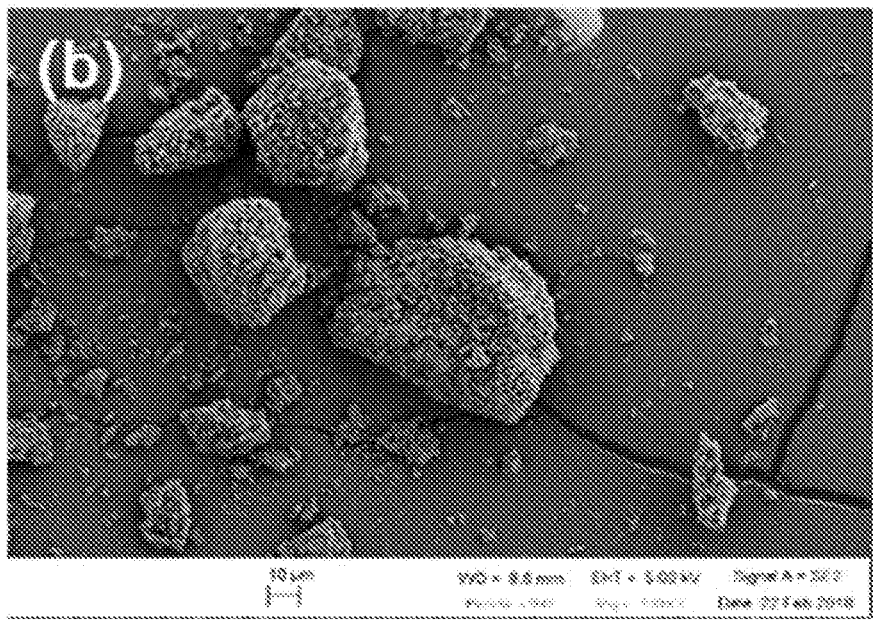
Figure 5:
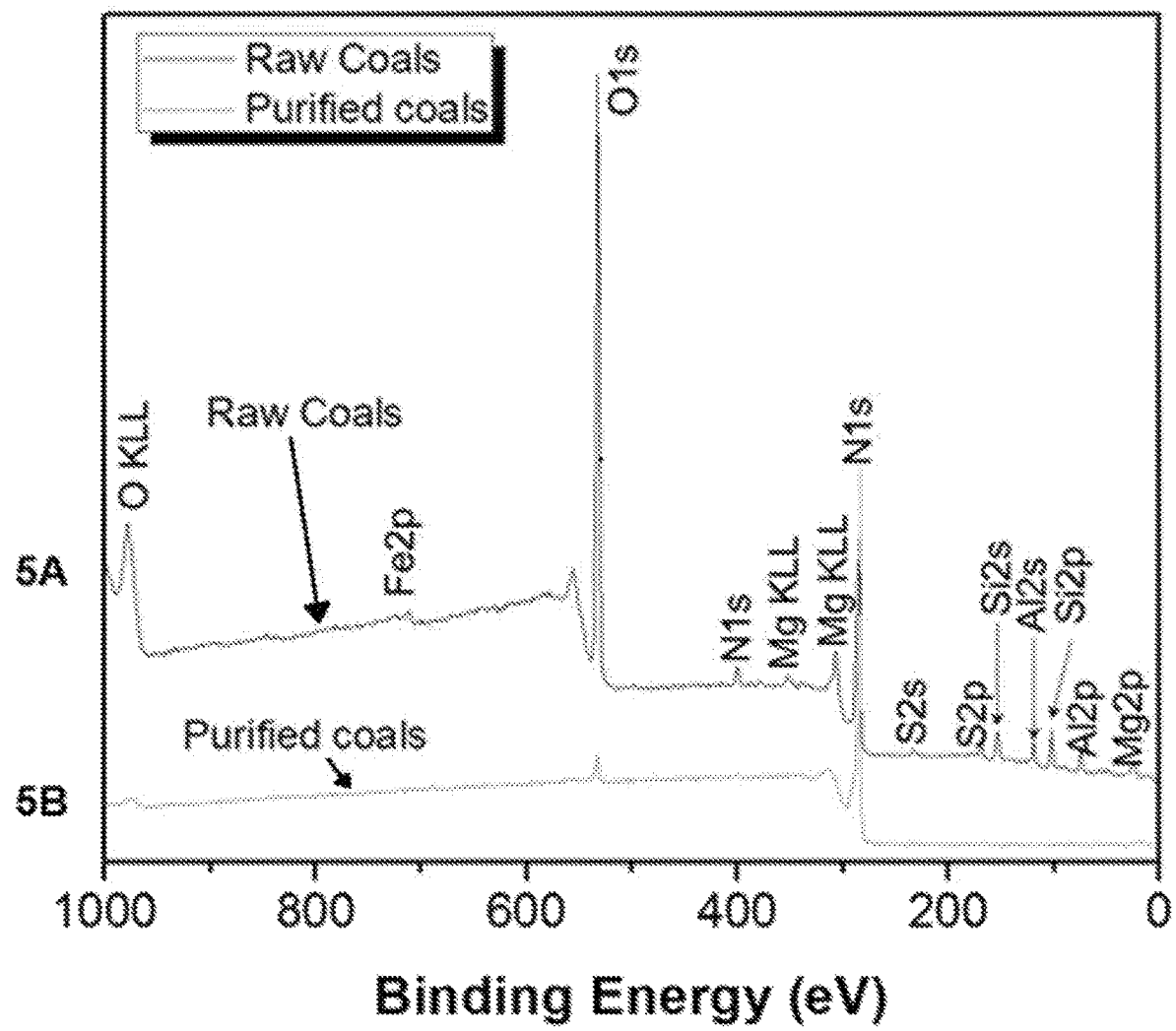
FIG. 5 shows X-ray photoelectron spectra (XPS) survey of raw coal (upper curve) and purified coal (lower curve).

A purified coal sample was prepared using raw chunk Anthracite. The raw Anthracite in the work showed 81.1% of Fixed Carbon, 13.2% of Ash, 3.4% of Volatile Matter, and 2.3% of Moisture determined by Proximate Analysis, which according to Coal Classification by American Society for Testing and Materials (ASTM) is classified as semi-anthracite. The raw chunk Anthracite was crushed and sifted using a sieve to obtain Anthracite granules. Further, the conventional ball-mill process was carried out in the polypropylene bottle with Anthracite granules and water for 2 days to obtain Anthracite fine powder. The dried Anthracite fine powder (~50 μm) was transferred to a convection furnace at 250° C. for 3 h to remove organic impurities and amorphous carbons, and then cooled to room temperature naturally. Next, the heat-treated coal was immersed in 10% HF and 5% HCl in sequence to remove inherent metal impurities and silica materials in the coal to produce the purified coal. SEM images of the starting material and the purified coal are depicted in FIGS. 4A-4B demonstrating the morphological changes from the purification. X-ray photoelectron spectroscopy (FIG. 5) demonstrated the removal of trace impurities (e.g. trace metals such as Fe, Mg, and Al) from the purification process.

Figures 6A, 6B:
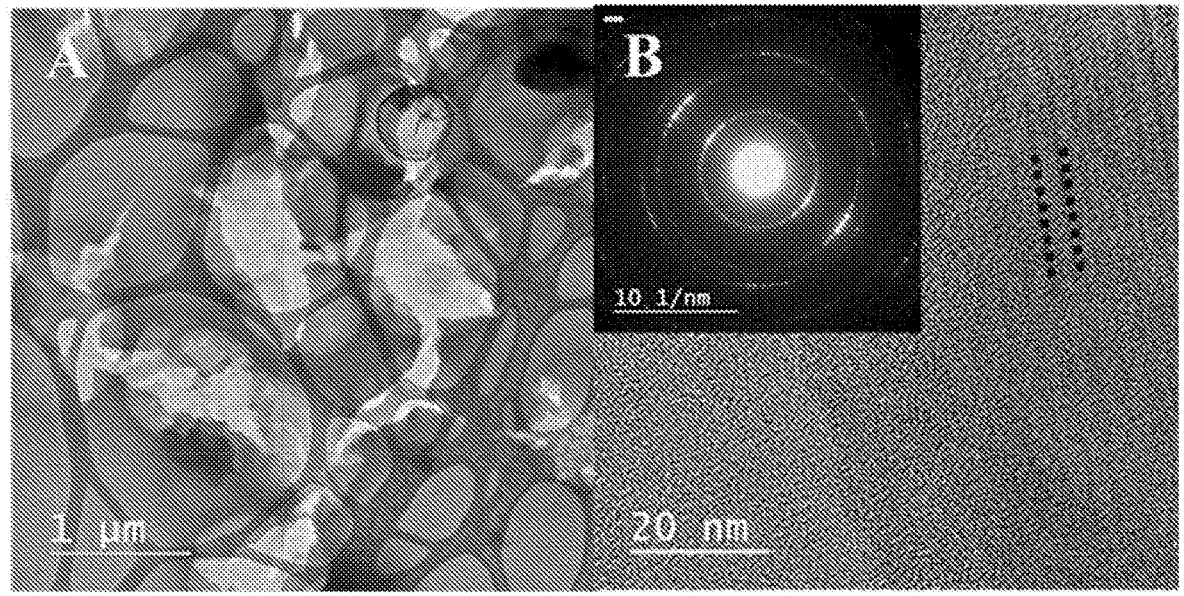
FIGS. 6A-6B show transmission electron microscope (TEM) images of coal derived graphene oxide (coal-GO) with the nanosheets.
Figure 7:
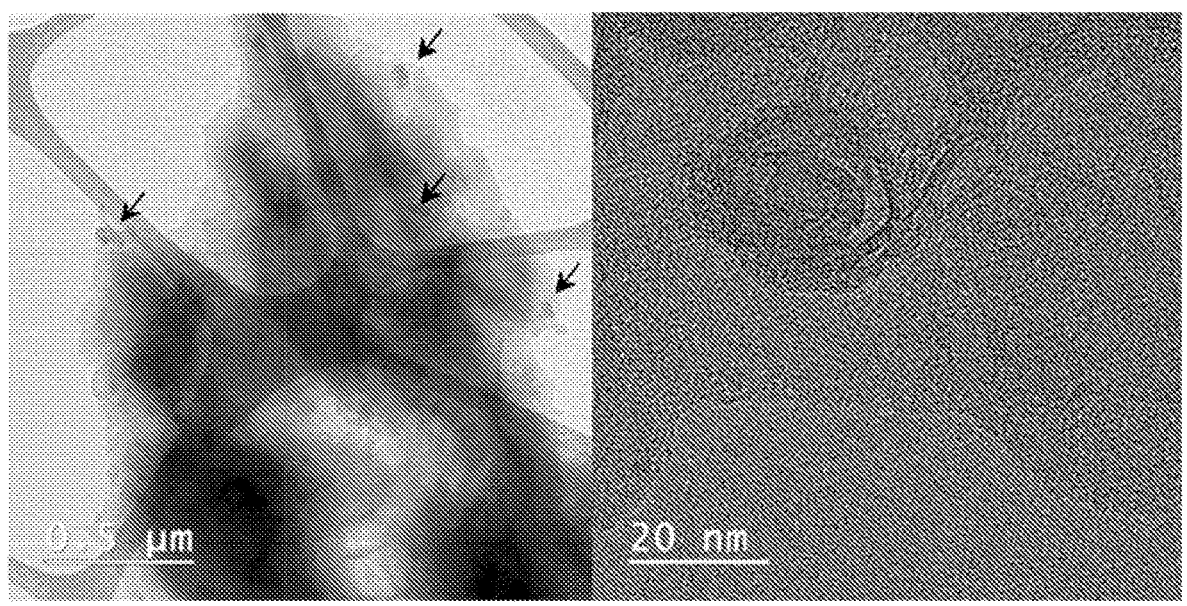
FIG. 7 shows transmission electron microscope (TEM) images of the nanoscroll structures in the coal derived graphene oxide (coal-GO).

Example 2: Production of Coal-Derived Graphene Oxide from Purified Coal 3 g of the purified coal was oxidized in 60 mL of $HNO_3$ solution at 80° C. for ~5 h. After cooling to room temperature, the oxidized coal was washed with DI water to remove some unreacted residues, and further neutralized up to pH 7. The oxidized coal solution was mechanically exfoliated by probe-type ultrasonicator for ~4 h in an ice-bath to increase the yield of graphene oxide. The coal-derived graphene oxides were separated from unreacted or unexfoliated coal impurities by centrifuging technique. The centrifuging process was performed at 5000 rpm for 20 min. The brown solution of coal-derived graphene oxide was transferred to lyophilization to obtain the powdery coal-derived graphene oxide (coal-GO). The coal derived graphene oxide (coal-GO) was observed to have nanosheet structures via transmission electron microscope (TEM) (see e.g. FIGS. 6A-6B and FIG. 7).

Example 3: Reduction of Coal-Derived Graphene Oxide

Figure 8:
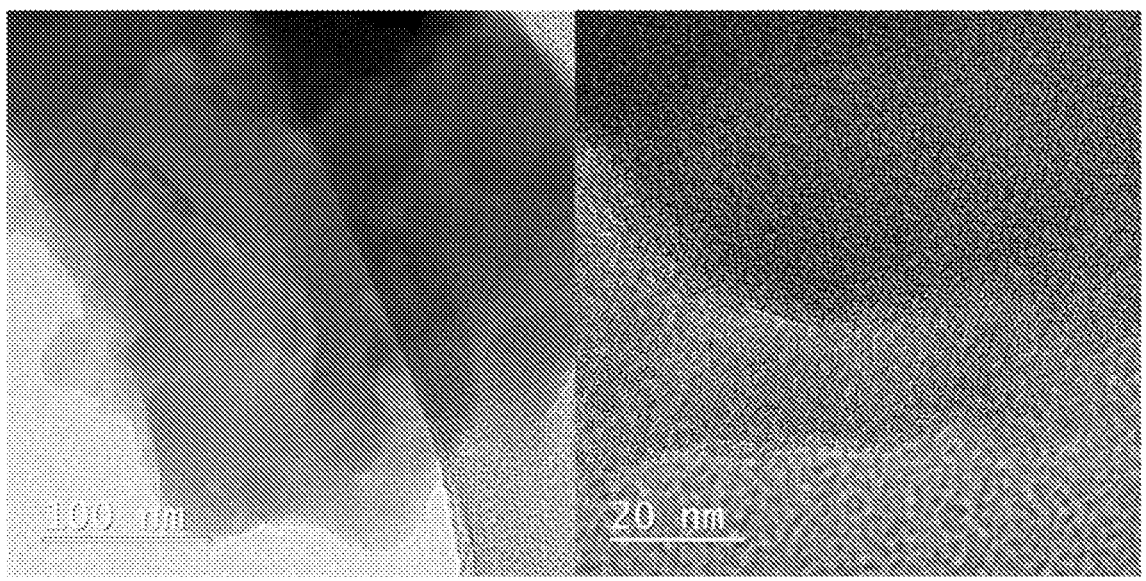
FIG. 8 shows transmission electron microscope (TEM) image of the thermally reduced coal derived graphene oxide (coal-rGO).
Figure 9:
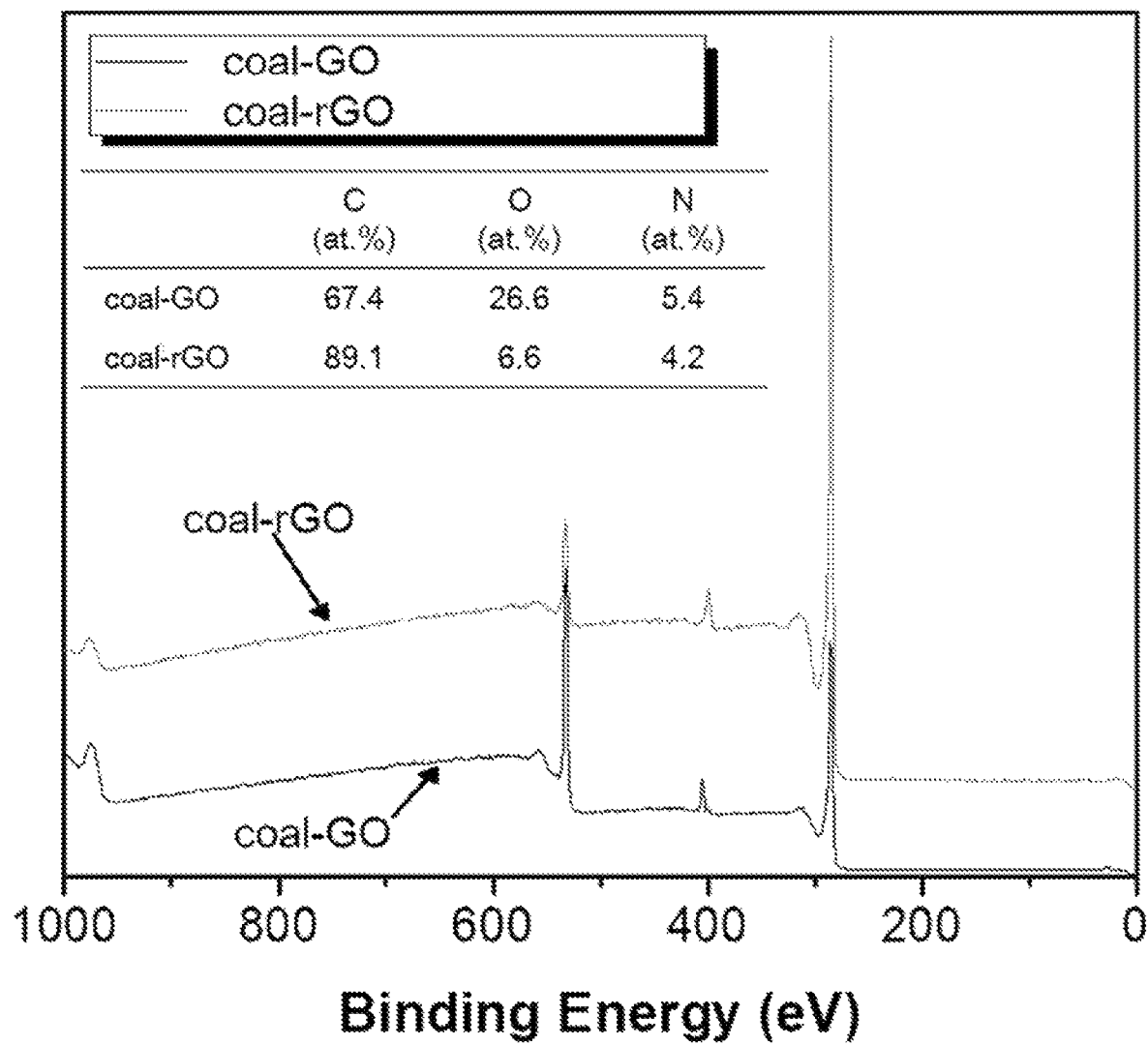
FIG. 9 shows X-ray photoelectron spectra (XPS) survey of coal derived graphene oxide (coal-GO) (lower curve) and thermally reduced coal derived graphene oxide (coal-rGO) (upper curve). An elemental composition of both samples is provided in the inset.
Figures 10A, 10B, 10C:
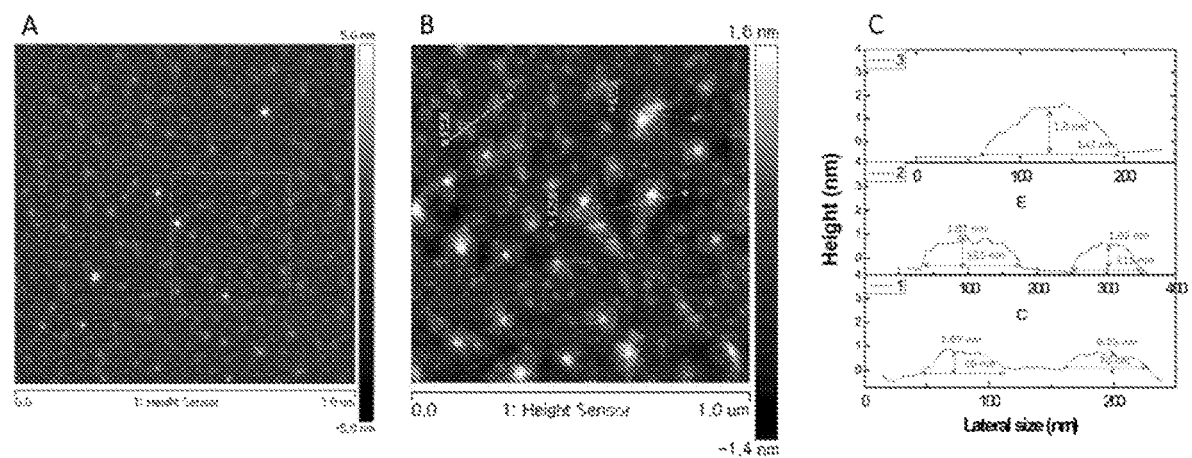
FIGS. 10A-10C show atomic force microscope (AFM) images of thermally reduced coal-derived GO (coal-rGO), (FIG. 10A); an enlarged view of yellow box in FIG. 10A (FIG. 10B); height and lateral size profiles of thermally reduced coal-derived graphene oxide (FIG. 10C).
Figure 11:
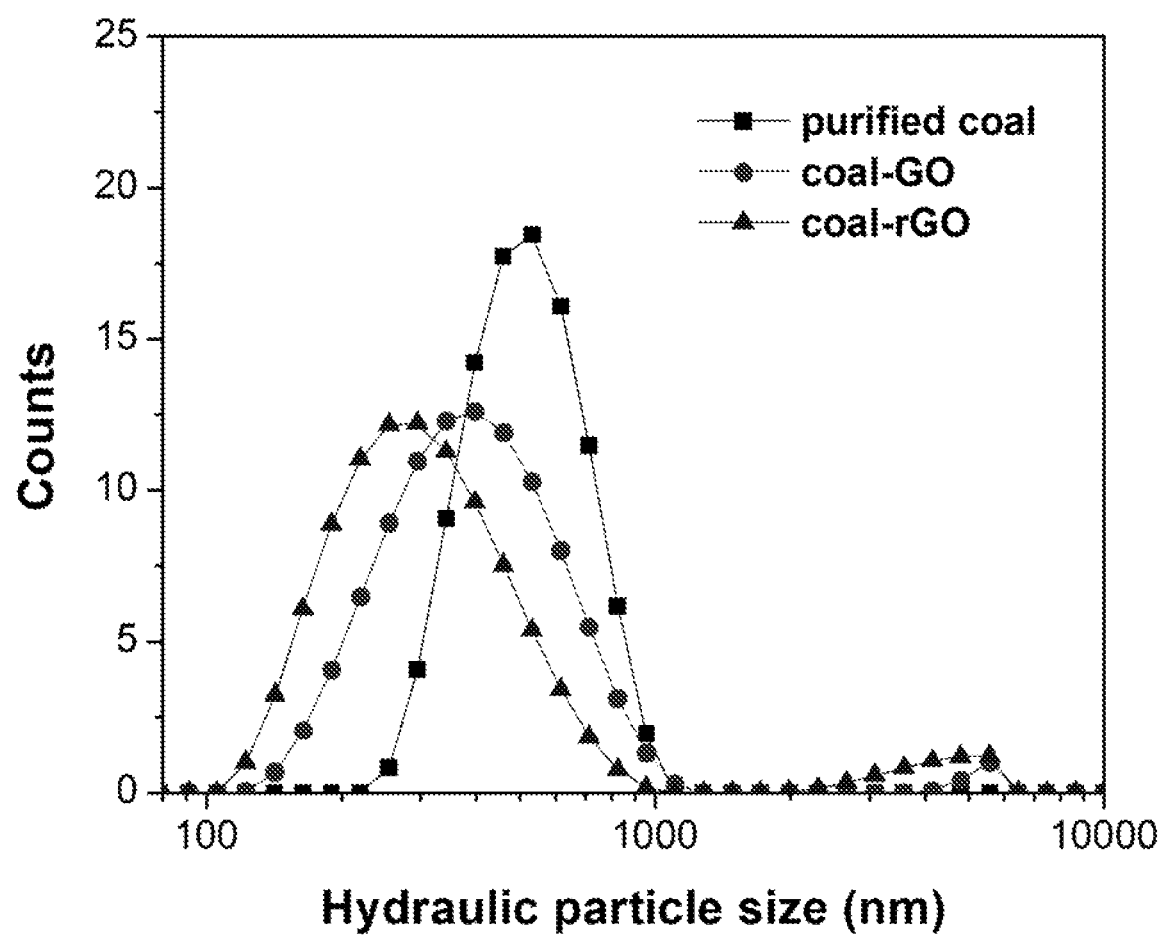
FIG. 11 shows the particle size distribution obtained with dynamic light scattering (DLS) of coal-derived GO (coal-GO) and thermally reduced coal-derived GO (coal-rGO).

The reduced coal-GO was prepared by thermal reduction method. The brownish coal-GO powder was placed in a tubular furnace and heated at a rate of 5° C./min under $N_2$ flow to reach the target temperature of 600° C. for 1 h. The furnace was then cooled to room temperature naturally, producing a coal-derived reduced GO (coal-rGO). FIG. 8 and FIG. 10 show transmission electron microscope (TEM) and atomic force microscopy (AFM) images of the thermally reduced coal derived graphene oxide (coal-rGO), respectively. FIG. 9 shows X-ray photoelectron spectra (XPS) survey of coal derived graphene oxide (coal-GO) (upper) and thermally reduced coal derived graphene oxide (coal-rGO) (lower).

Aspects of the Disclosure

The disclosure will be better understood upon reading the following numbered aspects which should not be confused with the claims. Each of the numbered aspects described below can in some instances be combined with additional aspects described above.

The disclosure will be better understood upon reading the following numbered aspects which should not be confused with the claims. Each of the numbered aspects described below can in some instances be combined with additional aspects described above.

Aspect 1. A method of producing graphene oxide, the method comprising placing a purified coal powder in a mild oxidation atmosphere at an elevated temperature with respect to room temperature for a period of time to produce a mixture comprising the graphene oxide.

Aspect 2. The method according to any one of aspects 1-20, wherein placing the purified coal powder in the mild oxidation atmosphere comprises contacting the purified coal powder with a mild oxidizing acid selected from the group consisting of nitric acid, nitrous acid, sulfuric acid, phosphoric acid, benzoic acid, and a combination thereof.

Aspect 3. The method according to any one of aspects 1-20, wherein the mild oxidizing acid consists essentially of nitric acid.

Aspect 4. The method according to any one of aspects 1-20, wherein the elevated temperature is up to about 120° C., is about 65° C. to 200° C., about 80° C. to 150° C., or about 90° C. to 130° C.

Aspect 5. The method according to any one of aspects 1-20, wherein the period of time is about 1 min to 24 hours, about 1 hours to 5 hours, about 2 hours to about 5 hours, or about 2 hours to about 8 hours.

Aspect 6. The method according to any one of aspects 1-20, wherein the mixture further comprises one or more impurities; and wherein the method further comprises separating the graphene oxide from the one or more impurities.

Aspect 7. The method according to any one of aspects 1-20, wherein the one or more impurities comprise unreacted coal impurities, unexfoliated coal impurities, or a combination thereof.

Aspect 8. The method according to any one of aspects 1-20, wherein the separating the graphene oxide from the one or more impurities comprises one or more of centrifugation, filtration, and sedimentation.

Aspect 9. The method according to any one of aspects 1-20, wherein the purified coal powder has an average particle size of about 100 μm, about 75 μm, about 50 μm, or less, e.g. about 20 μm to about 100 μm or about 25 μm to about 75 μm.

Aspect 10. The method according to any one of aspects 1-20, wherein the purified coal powder is substantially free, essentially free, or free of metal impurities selected from the group consisting of Al, Sb, As, Ba, Be, Cd, Ca, Cr, Co, Cu, Fe, Pb, Mg, Mn, Hg, Mo, Ni, K, Se, Ag, Na, Sr, Sn, V, and Zn.

Aspect 11. The method according to any one of aspects 1-20, wherein the purified coal powder is substantially free, essentially free, or free of silicon.

Aspect 12. The method according to any one of aspects 1-20, wherein the purified coal powder being substantially free of an impurity is determined by a peak associated with the impurity not being discernable in an X-Ray photoelectron spectra of the purified coal powder.

Aspect 13. The method according to any one of aspects 1-20, wherein the method is performed in a continuous reactor, and wherein the elevated temperature and the period of time are such that an integral $A = \int TE(t)dt$ is about 350 Kelvin hours, about 400 Kelvin hours, about 500 Kelvin Hours, or greater, or wherein A is about 400 Kelvin hours to about 2,250 Kelvin hours, where T is a steady state temperature of the reactor and E(t) is a residence-time of the mixture in the continuous reactor.

Aspect 14. The method according to any one of aspects 1-20, wherein the method is performed in a batch reactor, and wherein the elevated temperature and the period of time are such that an integral $A=\int_{t_0}^{t_f}T(t)dt$ is about 350 Kelvin hours, about 400 Kelvin hours, about 500 Kelvin Hours, or greater, or wherein A is about 400 Kelvin hours to about 2,250 Kelvin hours, where T(t) is a temperature of the reactor at time t, $t_0$ is an initial time, and $t_f$ is a final time that the mixture is in the batch reactor.

Aspect 15. The method according to any one of aspects 1-20, wherein A is about 400 Kelvin hours to about 2,250 Kelvin hours.

Aspect 16. The method according to any one of aspects 1-20, further comprising initially producing the purified coal powder from a raw coal by: (a) producing a raw coal powder by one or both of ball milling and sieving the raw coal; (b) heating the raw coal powder to remove organic impurities from the raw coal powder; and (c) removing metal and silica impurities from the raw coal powder by treating the raw coal powder with one or both of hydrofluoric acid and hydrochloric acid to produce the purified coal powder.

Aspect 17. The method according to any one of aspects 1-20, further comprising lyophilizing the graphene oxide to produce a powder comprising the graphene oxide.

Aspect 18. The method according to any one of aspects 1-20, further comprising heating the graphene oxide to a second elevated temperature for a second period of time while in an inert atmosphere to produce a reduced graphene oxide.

Aspect 19. The method according to any one of aspects 1-20, wherein the second elevated temperature is about 200° C. to 2000° C., about 200° C. to 1500° C., or about 400° C. to 1000° C.

Aspect 20. The method according to any one of aspects 1-19, wherein the second period of time is about 10 minutes to about 300 minutes or about 30 minutes to about 300 minutes or about 1 hour.

Aspect 21. A graphene oxide produced by a method according to any one of aspects 1-17.

Aspect 22. A graphene oxide produced by a method according to any one of aspects 1-17 showing the mean particle size range of about 100 to about 500 nm with symmetric particle size distribution.

Aspect 23. A reduced graphene oxide produced by a method according to any one of aspects 18-20.

Aspect 24. A reduced graphene oxide produced by a method according to any one of aspects 18-20 showing the mean particle size of about 80 to about 400 nm with symmetric particle size distribution.

Aspect 25. A reduced graphene oxide produced by a method according to any one of aspects 18-20 showing the lateral size range of about 70 to about 200 nm and the height range of about 0.8 nm to about 2 nm.

Aspect 26. A reduced graphene oxide produced by a method according to any one of aspects 18-20 showing a few layered graphene of 3-5 layers.

REFERENCES

1. Novoselov K S, et al. (2012) A roadmap for graphene. Nature 490 (7419):192-200.
2. Pei S, Wei Q, Huang K, Cheng H-M, & Ren W (2018) Green synthesis of graphene oxide by seconds timescale water electrolytic oxidation. Nature Communications 9 (1):145.
3. Kim J, Cote L J, & Huang J (2012) Two Dimensional Soft Material: New Faces of Graphene Oxide. Accounts of Chemical Research 45 (8):1356-1364.
4. GENUITY C (2017) Battery sector to drive major increase in graphite demand.
5. Ye R Q, et al. (2013) Coal as an abundant source of graphene quantum dots. Nat Commun 4.
6. Ye R Q, et al. (2015) Bandgap Engineering of Coal-Derived Graphene Quantum Dots. Acs Appl Mater Inter 7 (12):7041-7048.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A method of producing graphene oxide, the method comprising placing a purified coal powder in a mild oxidation atmosphere at an elevated temperature with respect to room temperature for a period of time to produce a mixture comprising the graphene oxide, wherein the mixture comprises one or more impurities comprising unreacted coal impurities, unexfoliated coal impurities, or a combination thereof;

wherein the method further comprises separating the graphene oxide from the one or more impurities;

and wherein the separating the graphene oxide from the one or more impurities comprises one or more of mechanical exfoliation, centrifugation, filtrations, and sedimentation.

2. The method according to claim 1, wherein the placing the purified coal powder in the mild oxidation atmosphere comprises contacting the purified coal powder with a mild oxidizing acid selected from the group consisting of nitric acid, nitrous acid, sulfuric acid, phosphoric acid, benzoic acid, and a combination thereof.

3. The method according to claim 2, wherein the mild oxidizing acid consists essentially of nitric acid.

4. The method according to claim 3, wherein the elevated temperature is up to about 120° C.

5. The method according to claim 3, wherein the period of time is about 1 min to about 24 hours.

6. The method according to claim 3, wherein the purified coal powder has an average particle size of about 50 μm or less.

7. The method according to claim 1, wherein the purified coal powder is substantially free of impurities selected from the group consisting of Al, Sb, As, Ba, Be, Cd, Ca, Cr, Co, Cu, Fe, Pb, Mg, Mn, Hg, Mo, Ni, K, Se, Ag, Na, Sr, Sn, V, and Zn.

8. The method according to claim 1, wherein the purified coal powder is substantially free of silicon.

9. The method according to claim 7, wherein the purified coal powder being substantially free of an impurity is determined by a peak associated with the impurity not being discernable in an X-Ray photoelectron spectra of the purified coal powder.

10. The method according to claim 1, wherein the method is performed continuously over a period of time in a reactor, wherein the elevated temperature and the period of time are such that an integral $A=\int TE(t)dt$ is about 350 Kelvin hours or greater, where T is a steady state temperature of the reactor and E(t) is a residence-time of the mixture in the reactor, and wherein A is about 400 Kelvin hours to about 2,250 Kelvin hours.

11. The method according to claim 1, wherein the method is performed in a reactor running in batch mode, wherein the elevated temperature and the period of time are such that an integral $A=\int_{t_0}^{t_f}T(t)dt$ is about 350 Kelvin hours or greater, where T(t) is a temperature of the reactor at time t, $t_0$ is an initial time, and $t_f$ is a final time that the mixture is in the reactor, and wherein A is about 400 Kelvin hours to about 2,250 Kelvin hours.

12. The method according to claim 10, wherein A is about 400 Kelvin hours to about 2,250 Kelvin hours.

13. The method according to claim 11, wherein A is about 400 Kelvin hours to about 2,250 Kelvin hours.

14. The method according to claim 1, further comprising initially producing the purified coal powder from a raw coal by:

(a) producing a raw coal powder by one or both of ball milling and sieving the raw coal;

(b) heating the raw coal powder to remove organic impurities from the raw coal powder; and (c) removing metal and silica impurities from the raw coal powder by treating the raw coal powder with one or both of hydrofluoric acid and hydrochloric acid to produce the purified coal powder.

15. The method according to claim 1, further comprising lyophilizing the graphene oxide to produce a powder comprising the graphene oxide.

16. The method according to claim 1, further comprising heating the graphene oxide to a second elevated temperature for a second period of time while in an inert atmosphere to produce a reduced graphene oxide.

17. The method according to claim 16, wherein the second elevated temperature is about 400° C. to about 1000° C.

18. The method according to claim 16, wherein the second period of time is about 10 minutes to about 300 minutes.

* * * * *